US012747370B2

(12) United States Patent
Bernad et al.

(10) Patent No.: US 12,747,370 B2
(45) Date of Patent: Sep. 29, 2026

(54) WATER BASED COATING COMPOSITION FOR WIND BLADES

(71) Applicant: HEMPEL A/S, Kgs. Lyngby (DK)

(72) Inventors: Pablo Luis Bernad, Kgs. Lyngby (DK); Christina Jung, Kgs. Lyngby (DK); Craig E. Wood, Kgs. Lyngby (DK)

(73) Assignee: HEMPEL A/S, Kongens Lyngby (DK)

( * ) Notice: Subject to any disclaimer, the term of this patent is extended or adjusted under 35 U.S.C. 154(b) by 46 days.

(21) Appl. No.: 18/706,485

(22) PCT Filed: Nov. 4, 2022

(86) PCT No.: PCT/EP2022/080822
§ 371 (c)(1),
(2) Date: May 1, 2024

(87) PCT Pub. No.: WO2023/079078
PCT Pub. Date: May 11, 2023

(65) Prior Publication Data
US 2025/0002750 A1 Jan. 2, 2025

(30) Foreign Application Priority Data
Nov. 5, 2021 (EP) .................................... 21206656

(51) Int. Cl.
*C09D 175/04* (2006.01)
*F03D 1/06* (2006.01)
(Continued)

(52) U.S. Cl.
CPC ......... *C09D 175/04* (2013.01); *F03D 1/0675* (2013.01); *F04D 29/02* (2013.01);
(Continued)

(58) Field of Classification Search
CPC .......... F05B 2230/90; F05B 2280/6011; F05B 2280/4003; F05B 2260/95;
(Continued)

(56) References Cited

U.S. PATENT DOCUMENTS 6,482,885 B1 * 11/2002 Muller .................. C08G 18/12
524/591
2017/0044397 A1 * 2/2017 Muench ................ C08G 18/10
(Continued)

FOREIGN PATENT DOCUMENTS

CN 102533078 7/2012
CN 102675998 7/2014
(Continued)

OTHER PUBLICATIONS

International Search Report and Written Opinion were mailed on Feb. 15, 2023 by the International Searching Authority for International Application No. PCT/EP2022/080822 filed on Nov. 4, 2022 and published as WO2023079078 (Applicant—Hempel A/S) (14 pages).
(Continued)

*Primary Examiner* — Courtney D Heinle
*Assistant Examiner* — Art Golik
(74) *Attorney, Agent, or Firm* — Ballard Spahr.LLP

(57) ABSTRACT

Described herein is a wind blade comprising an outer surface, and at least one coating layer applied to a part of the outer surface, the at least one coating layer including a first coating layer comprising: a) a primary composition comprising one or more aqueous dispersion of an aliphatic polyurethane; wherein said aqueous dispersion has a particle size characterized by a D50 (median) value below 1000 nm; and optionally b) a secondary composition comprising one or more polyisocyanates; wherein when the coating composition comprises b) then said aqueous dispersion in a) is
(Continued)

Figure 1:
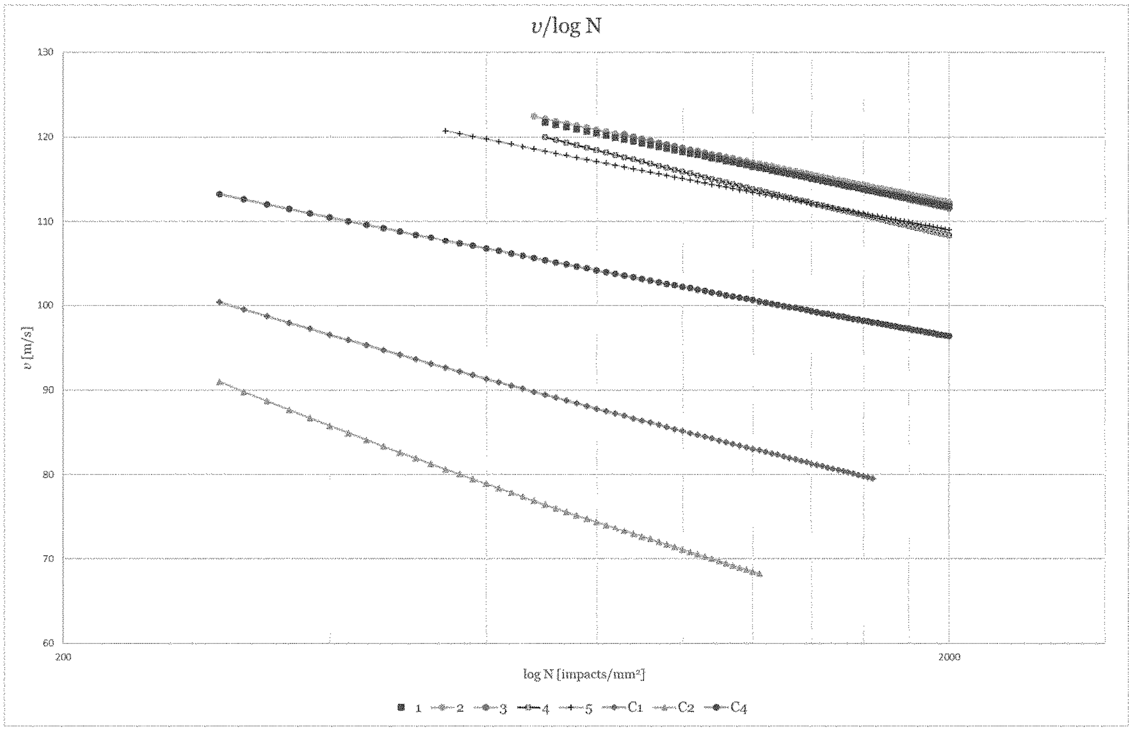

present in an amount of at least 5 times the amount of said polyisocyanate in b) based on weight; when b) is absent then the coating composition is a one-component composition.

17 Claims, 6 Drawing Sheets

(51) Int. Cl.

| | |
|---|---|
| ***F04D 29/02*** | (2006.01) |
| *C09D 175/06* | (2006.01) |
| *C09D 175/08* | (2006.01) |
| *C09D 175/10* | (2006.01) |
| *C09D 175/12* | (2006.01) |
| *F01D 5/28* | (2006.01) |

(52) U.S. Cl.
CPC ......... *C09D 175/06* (2013.01); *C09D 175/08* (2013.01); *C09D 175/10* (2013.01); *C09D 175/12* (2013.01); *F01D 5/286* (2013.01); *F01D 5/288* (2013.01); *F04D 29/023* (2013.01); *F04D 29/026* (2013.01); *F05B 2230/90* (2013.01); *F05B 2260/95* (2013.01); *F05B 2280/4003* (2013.01); *F05B 2280/4011* (2013.01); *F05B 2280/6011* (2013.01); *F05D 2230/90* (2013.01); *F05D 2260/95* (2013.01); *F05D 2300/48* (2013.01)

(58) Field of Classification Search
CPC ........... F05B 2280/4011; F03D 1/0675; F01D 5/286; F01D 5/288; F05D 2230/90; F05D 2300/43; F05D 2300/611; F05D 2260/95; F05D 2300/48; F04D 29/02; F04D 29/023; F04D 29/026; C09D 175/04; C09D 175/06; C09D 175/08; C09D 175/10; C09D 175/12
See application file for complete search history.

(56) References Cited

U.S. PATENT DOCUMENTS

| | | | | |
|---|---|---|---|---|
| 2018/0002566 | A1* | 1/2018 | Seeger | B05D 1/02 |
| 2019/0323357 | A1* | 10/2019 | Courtier | B64C 11/30 |
| 2020/0010602 | A1* | 1/2020 | Carboni | C08G 18/706 |

FOREIGN PATENT DOCUMENTS

| | | | | |
|---|---|---|---|---|
| CN | 108285699 | | 7/2018 | |
| CN | 114851661 | A * | 8/2022 | B29D 7/01 |
| WO | WO 2011124602 | | 10/2011 | |
| WO | WO 2015161952 | | 10/2015 | |
| WO | WO 2018172526 | | 9/2018 | |
| WO | WO 2020260578 | | 12/2020 | |
| WO | WO 2022136554 | | 6/2022 | |

OTHER PUBLICATIONS

European Search Report was mailed on Apr. 8, 2022 by the European Patent Office for European Patent Application No. 21206656.7 filed on Nov. 4, 2022 (Applicant—Hempel A/S) (7 pages).

* cited by examiner

WATER BASED COATING COMPOSITION FOR WIND BLADES

CROSS-REFERENCE TO RELATED APPLICATIONS

This application is a U.S. National Phase Application of International Application No. PCT/EP2022/080822, filed Nov. 4, 2022, which claims priority to European Patent Application No. 21206656.7, filed Nov. 5, 2021.

FIELD OF THE INVENTION

The present invention relates to a water based coating composition for wind blades, in particular for erosion protection of wind blades. The invention also relates to the use of a water based coating composition for coating a wind blade, preferably for providing an erosion protecting topcoat on said wind blade. The invention also relates to a wind blade coated with a coating composition according to the invention and to a method for protecting a wind blade against erosion by application of a coating composition according to the invention on said wind blade and to a method for repairing and/or replacing the existing coating layer on a wind blade by application of a coating composition according to the invention.

BACKGROUND OF THE INVENTION

In recent years, wind energy has become an important source of electricity production, and contributes significantly to reducing $CO_2$ emissions. Wind power is the use of air flow through wind turbines to provide the mechanical power to turn electric generators.

Wind turbines typically have an upwind rotor with three blades, attached to a nacelle on top of a tall tubular tower. Wind turbine blades, or "wind blades" are usually designed to last around 20 to 25 years. The blades are constantly exposed to the elements and are ideally designed to endure temperature extremes, wind shears, precipitation, and/or other environmental hazards with minimal failure. Coating failure due to erosion is often observed on the wind blade. Rain, hail, ice, UV, water absorption and other weather conditions erode the surface of the wind blade. This affects the aerodynamic of the blade and could cause severe damages.

Due to the increased restriction on volatile organic compounds (VOCs) in coatings, solvent-free systems are advantageous as an environmentally friendly alternative.

Various types of coating compositions are used in protective coatings of wind blades for minimizing erosion whereof the majority are solvent-based and/or two-component compositions. WO 2015/161952 discloses a two-component water based coating composition for wind blades comprising an aqueous dispersion of a polymeric resin, a polycarbonate diol and a curing agent comprising polyisocyanate. The preparation of the base composition includes a process step where the polycarbonate diol is incorporated into the aqueous dispersion by emulsification into the dispersion. The resulting base composition is mixed with a polyisocyanate curing agent that reacts with hydroxy groups of the polycarbonate.

CN108285699 discloses a water based nanometer coating for wind blades prepared from a water-based emulsion. CN102675998 discloses a water-based fluorocarbon top coat for wind blades prepared by compounding an hydroxyl acrylic emulsion and a water-based fluorocarbon emulsion and crosslinking with isocyanate. CN102533078 discloses a water-based two-component polyurethane coating for a wind blade comprising a hydroxyl acrylic acid dispersion and a hydroxyl polyurethane dispersion.

There is an increasing demand for water based coatings both for environmental and for safety reasons. There is a need for new coating compositions for wind blades providing a good environmental profile and being cost-effective and convenient to produce and apply and at the same time providing a coat with good performance, including erosion resistance.

SUMMARY OF THE INVENTION

The present invention provides water based polyurethane coating compositions for wind blades. The coating composition is particularly useful for erosion protection of wind blades which are typically prepared from epoxy glass fiber reinforced plastic laminate.

Accordingly, in one aspect, the present invention relates to the use of a water based coating composition for coating a wind blade, preferably for providing erosion protection of said wind blade, wherein said coating composition comprises a) a primary composition comprising one or more aqueous dispersion of an aliphatic polyurethane; wherein said aqueous dispersion has a particle size characterized by a D50 (median) value below 1000 nm;

and optionally b) a secondary composition comprising one or more polyisocyanates; wherein when the coating composition comprises b) then said one or more aqueous dispersion in a) is present in an amount of at least 5 times the amount of said one or more polyisocyanate in b) based on weight;

when b) is absent then the coating composition is a one-component composition.

In one aspect, the invention relates to a wind blade having on at least a part of the outer surface thereof, a coat made from a coating composition of the invention, preferably an erosion protection topcoat. In a preferred embodiment, said wind blade is prepared from epoxy glass fiber reinforced plastic laminate.

FIGURES

FIG. 1. v/N curves for rain erosion experiments for compositions 1, 2, 3, 4, 5 and C1, C2 and C4 obtained as described in the experimental section.

Figure 2:
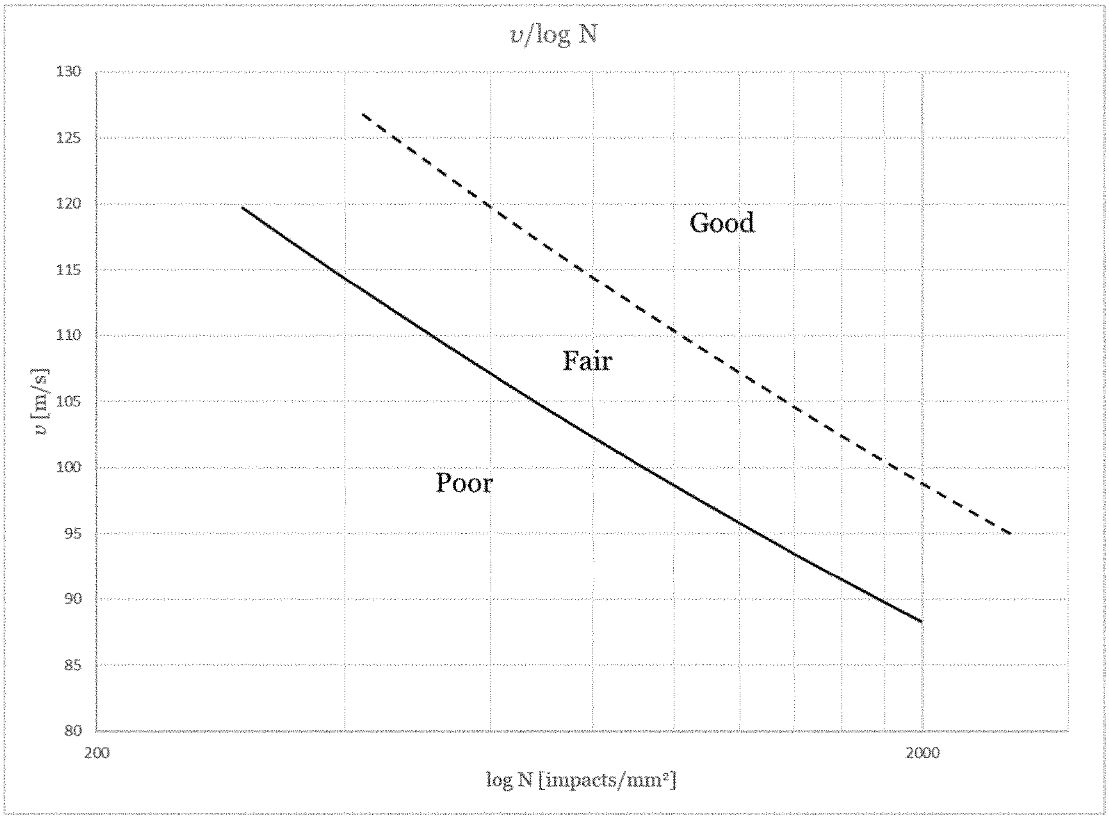

FIG. 2. v/N simulation curves illustrating ratings for rain erosion resistance.

For both figures: y-axis: v[m/s]; x-axis: log N, [impacts/$mm^2$].

Figure 3:
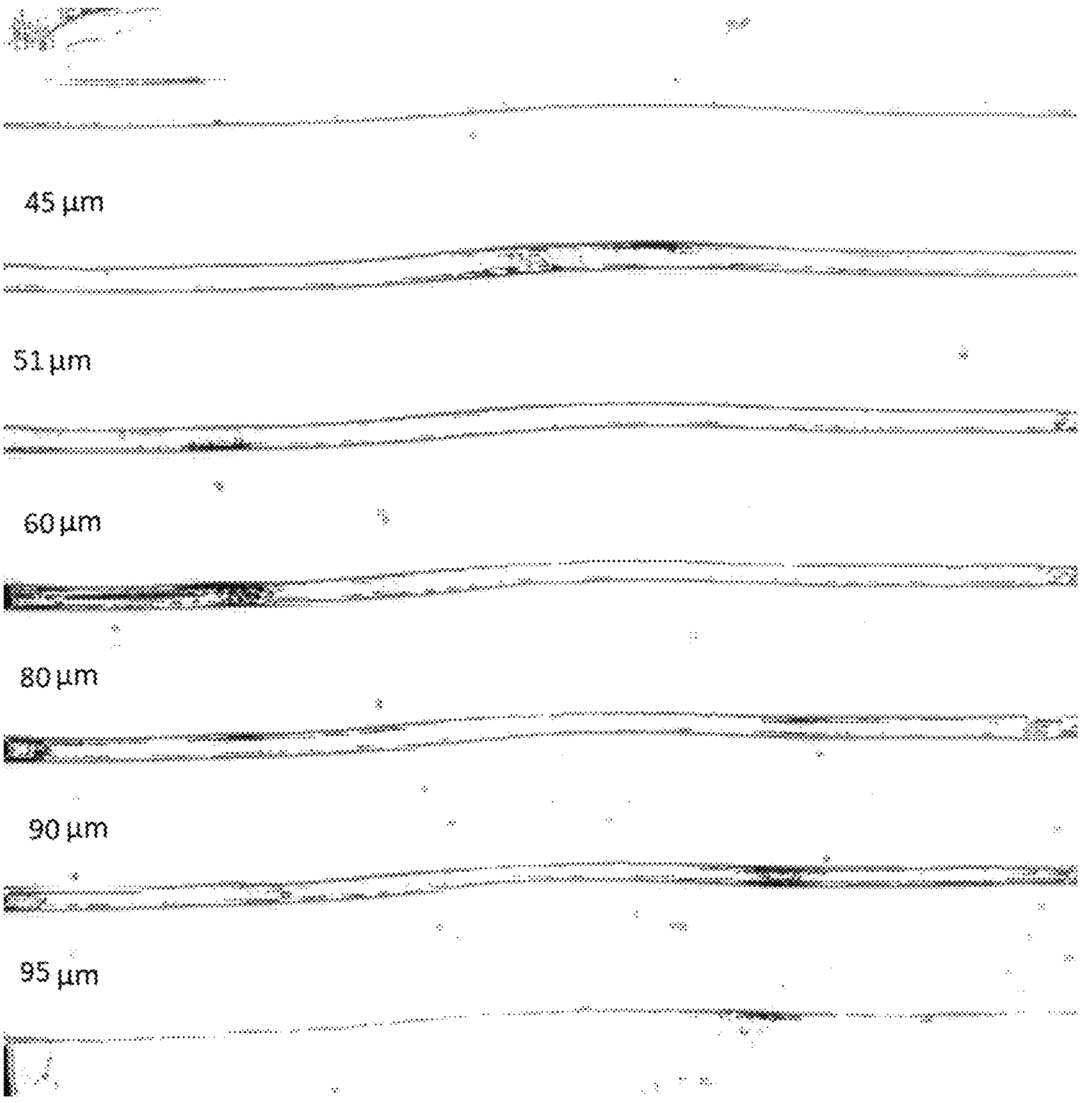
Figure 4:
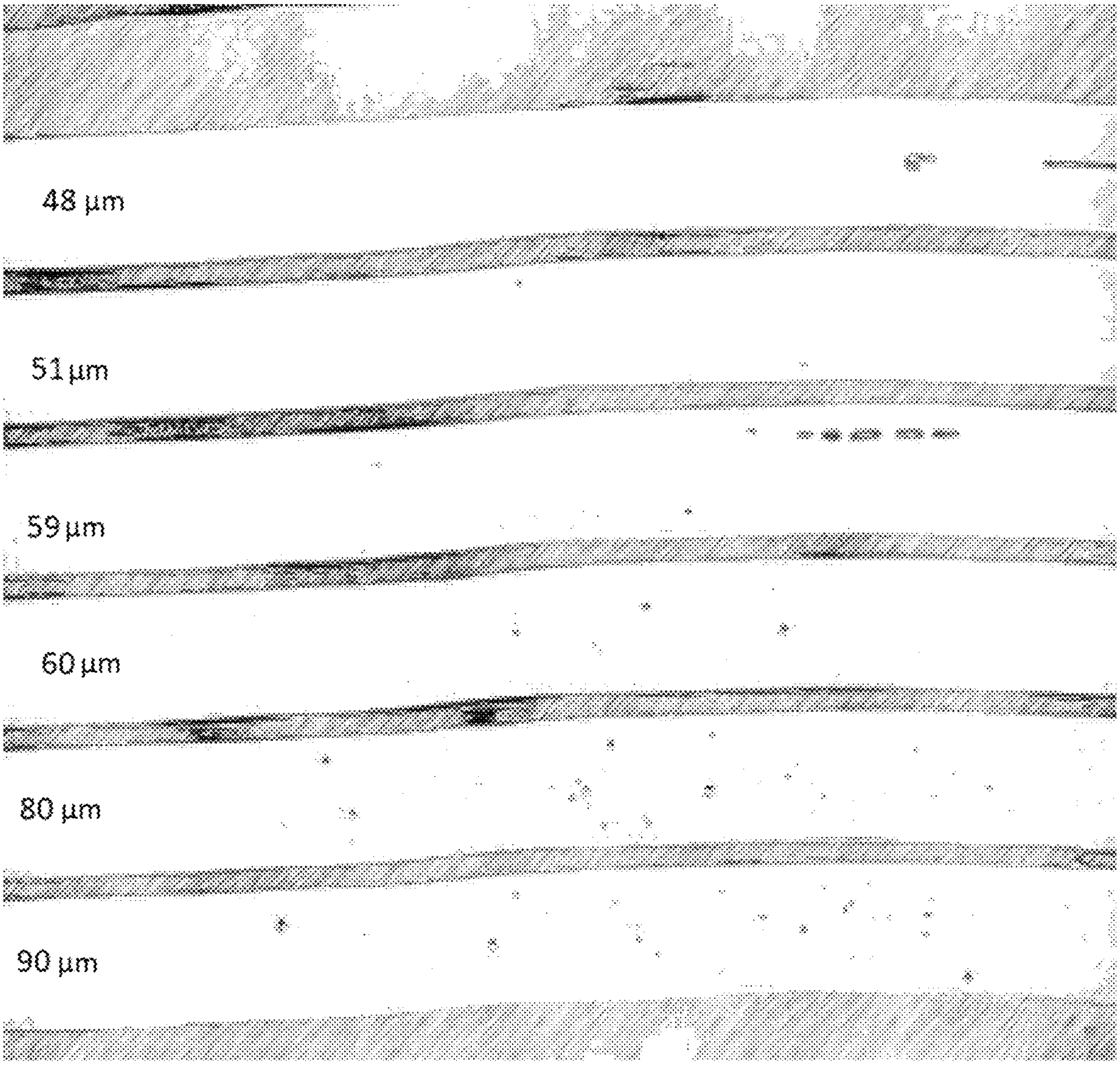
Figure 5:
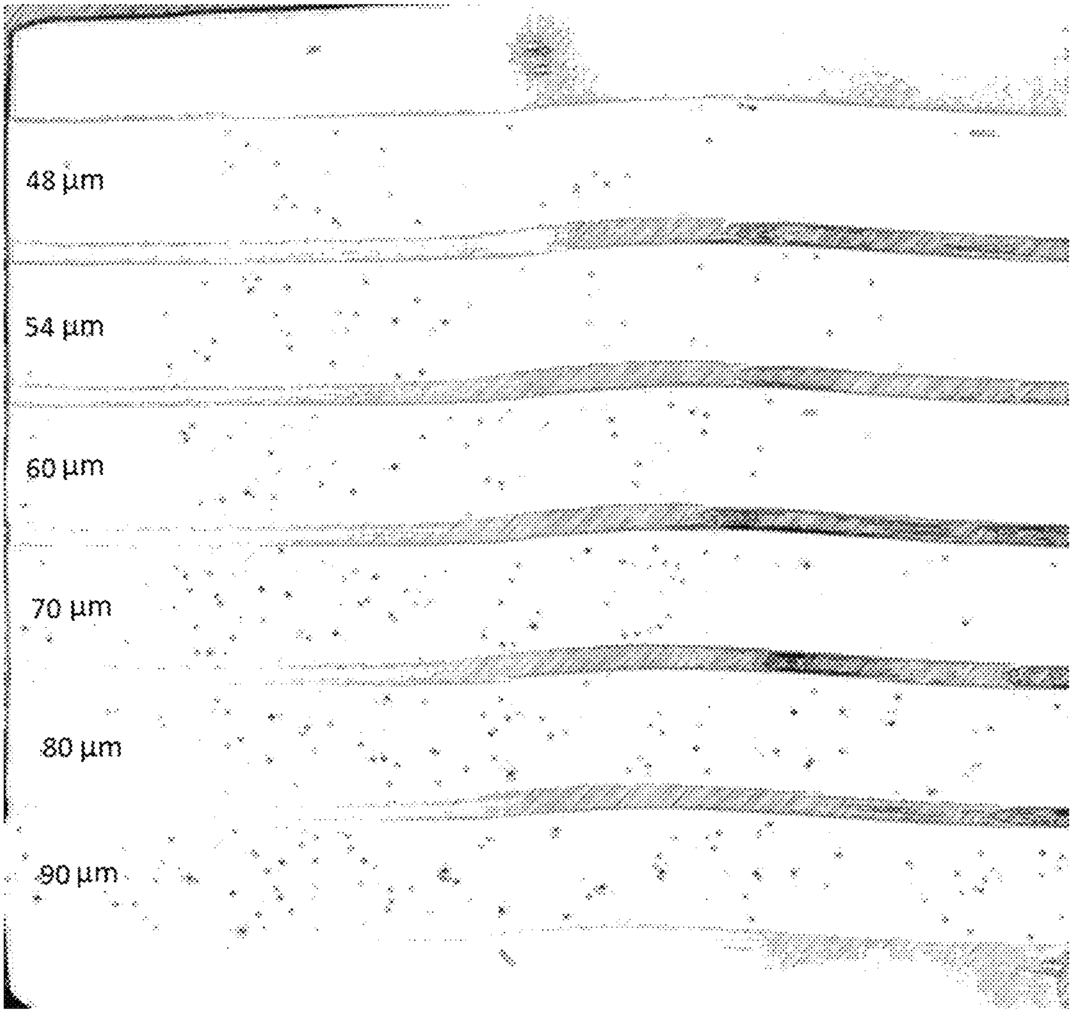

FIGS. 3, 4 and 5. Applications of coatings with various weight ratios of polyurethane dispersion: isocyanate (pictures converted to drawings with a cellphone (Huawei P20 lite)). Coating was applied as described in the experimental section with increasing dry film thickness (μm) indicated with numbering from top to bottom.

FIG. 3: composition T1, FIG. 4: composition T2 and FIG. 5: Composition T3.

Figure 6:
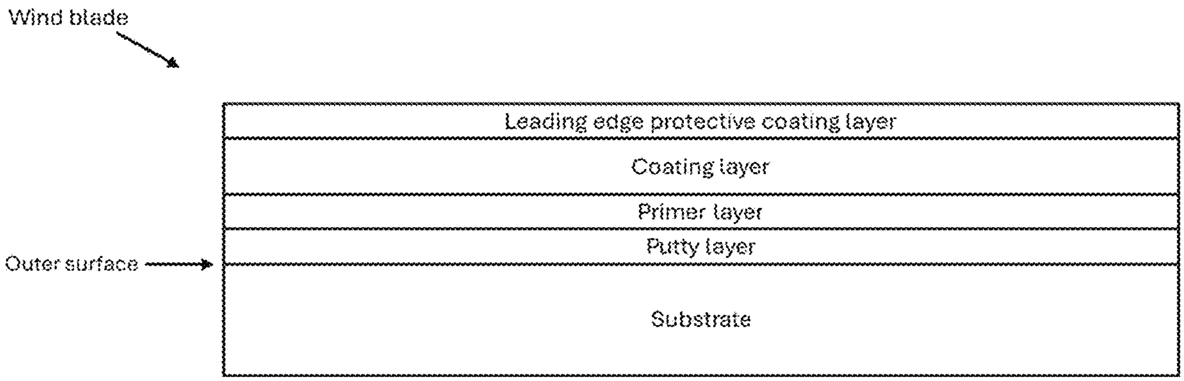

FIG. 6. A schematic illustrating an exemplary wind blade as described herein.

DETAILED DESCRIPTION OF THE INVENTION

The present invention relates to an aqueous polyurethane coating composition for wind blades. The inventors surprisingly found that a topcoat with a generally good performance including rain erosion resistance can be obtained with a one-component water based coating composition. which is cost-effective and convenient to produce from commercially available components.

Accordingly, the invention relates to a wind blade coating composition which is water based and comprises, a) a composition comprising one or more aqueous dispersion of an aliphatic polyurethane. Preferably, said aqueous dispersion has a particle size characterized by a D50 (median) value below 1000 nm.

Generally known wind blade coatings aimed for providing resistance against harsh weather are based on crosslinking. It is well known from literature that cross-linked films possess better mechanical properties and higher levels of performance than one-component systems (see e.g. *Organic Coatings, science and technology*, Wiley-Interscience, third edition, 2007 page 38 or *The Chemistry and Physics of Coatings*, Edited by A. Marrion, International Coatings, Akzo Nobel, Tyne and Wear, UK; $2^{nd}$ edition, 2004 page 49).

Now, the present inventors have surprisingly been able to obtain an erosion resistant topcoat by a one-component water based coating composition. One-component coating compositions are convenient to produce since no extra mixing of multiple parts is required. Water based coating compositions are furthermore safer and more comfortable to work with than solvent based and they have a lower environmental impact.

In some embodiments, the coating composition may comprise minor amounts of b) one or more polyisocyanate as an additive which may improve mechanical properties of the topcoat such as the abrasion resistance. When one or more polyisocyanate is present in the coating composition it is present in a small amount not intended to provide any crosslinking with the polyurethane. When the coating composition comprises b) then said one or more aqueous dispersion in a) is present in an amount of at least 5 times the amount of said one or more polyisocyanate in b) based on weight.

In a first aspect, the invention relates to a water based coating composition for providing an erosion protection coat, preferably an erosion protection topcoat on a wind blade, wherein said coating composition comprises, a) a primary composition comprising one or more aqueous dispersion of an aliphatic polyurethane; and optionally b) a secondary composition comprising one or more polyisocyanates; wherein when the coating composition comprises b) then said one or more aqueous dispersion in a) is present in an amount of at least 5 times the amount of said one or more polyisocyanate in b), based on weight;

when b) is absent then the coating composition is a one-component composition comprising the primary composition a).

In a second aspect, the invention relates to an erosion protecting wind blade coating composition which is water based and comprises a) a primary composition comprising one or more aqueous dispersion of an aliphatic polyurethane;

and optionally b) a secondary composition comprising one or more polyisocyanates; wherein when the coating composition comprises b) then said one or more aqueous dispersion in a) is present in an amount of at least 5 times the amount of said one or more polyisocyanate in b), based on weight;

when b) is absent then the coating composition is a one-component composition comprising the primary composition a).

In a third aspect, the invention relates to the use of a water based coating composition for coating a wind blade, preferably for providing erosion protection of said wind blade, wherein said coating composition comprises a) a primary composition comprising one or more aqueous dispersion of an aliphatic polyurethane;

and optionally b) a secondary composition comprising one or more polyisocyanates; wherein when the coating composition comprises b) then said one or more aqueous dispersion in a) is present in an amount of at least 5 times the amount of said one or more polyisocyanate in b), based on weight;

when b) is absent then the coating composition is a one-component composition comprising the primary composition a).

In a fourth aspect, the invention relates to the use of a water based coating composition for protecting a wind blade against erosion, wherein said coating composition comprises a) a primary composition comprising one or more aqueous dispersion of an aliphatic polyurethane;

and optionally b) a secondary composition comprising one or more polyisocyanates; wherein when the coating composition comprises b) then said aqueous dispersion in a) is present in an amount of at least 5 times the amount of said polyisocyanate in b) based on weight;

when b) is absent then the coating composition is a one-component composition.

In a preferred embodiment of the third and the fourth aspect, said coating composition provides an erosion protection coat preferably an erosion protection topcoat on said wind blade.

In a fifth aspect, the invention relates to a method for coating a wind blade, comprising a step of applying a coating composition on at least a part of the outer surface of said wind blade and allowing film formation to take place, wherein said coating composition comprises a) a primary composition comprising one or more aqueous dispersion of an aliphatic polyurethane;

and optionally b) a secondary composition comprising one or more polyisocyanates; wherein when the coating composition comprises b) then said one or more aqueous dispersion in a) is present in an amount of at least 5 times the amount of said one or more polyisocyanate in b), based on weight;

when b) is absent then the coating composition is a one-component composition comprising the primary composition a).

In an embodiment of the fifth aspect, said method further comprises a step of applying a putty layer and/or a step of applying a primer layer.

In a sixth aspect, the invention relates to a method for protecting a wind blade against erosion, comprising a step of applying a coating composition on at least a part of the outer surface of said wind blade and allowing film formation to take place, wherein said coating composition comprises a) a primary composition comprising one or more aqueous dispersion of an aliphatic polyurethane;

and optionally b) a secondary composition comprising one or more polyisocyanates; wherein when the coating composition comprises b) then said one or more aqueous dispersion in a) is present in an amount of at least 5 times the amount of said one or more polyisocyanate in b), based on weight;

when b) is absent then the coating composition is a one-component composition comprising the primary composition a).

In an embodiment of the sixth aspect, said method further comprises a step of applying a putty layer and/or a step of applying a primer layer and/or a step of applying a leading edge protecting coating layer.

In a seventh aspect, the invention relates to a method for repairing and/or replacing or partly replacing an existing coating layer on a wind blade comprising a step of applying the coating composition according to invention to at least a portion of said wind blade.

In an eight aspect, the invention relates to a wind blade having on at least a part of the outer surface thereof, one or more coating layer prepared from a coating composition according to invention, preferably one or more erosion protection coating layer.

In a preferred embodiment of the eight aspect, said wind blade has on at least a part of the outer surface a multilayer system comprising A) a putty layer obtained applied on the outer surface of the substrate; and B) optionally a primer layer applied on the putty layer; and C) one or more coating layer, preferably one or more erosion protection coating layer, prepared from a coating composition according to invention; and D) optionally a leading edge protective coating layer covering at least a part of the wind blade such as at least a part of the leading edge of the wind blade.

In one embodiment, C and D are applied in reverse order so that either said leading edge protective coating layer D) has been applied on top of the one or more coating layers C); or said one or more coating layers C) have been applied on top of the leading edge protective coating layer D).

In a preferred embodiment of the eight aspect, said one or more coating layer prepared from a coating composition according to invention constitutes an erosion protection coat, more preferably an erosion protection topcoat.

In one embodiment of all aspects, b) is absent and the coating composition is a one-component composition; i.e. said coating composition is a one-component composition comprising a) a primary composition comprising one or more aqueous dispersion of an aliphatic polyurethane.

In another embodiment of all aspects, said coating composition does comprise b) i.e. said coating composition comprises a) a primary composition comprising one or more aqueous dispersion of an aliphatic polyurethane; and b) a secondary composition comprising one or more polyisocyanates; wherein a) is present in an amount of at least 5 times the amount of said one or more polyisocyanate in b), based on weight.

In a preferred embodiment of all aspects, said aqueous dispersion has a particle size characterized by a D50 (median) value below 1000 nm, such as below 900 nm, such as below 800 nm, such as below 700 nm, such as below 600 nm, preferably below 500 nm, such as below 400 nm or 300 nm, more preferably below 200 nm, such as below 100 nm.

In a preferred embodiment of all the aspects wherein the coating composition comprises b) said one or more aqueous dispersion in a) is present in an amount of at least 5 times the amount of said one or more polyisocyanate in b), preferably at least 6 times, such as at least 7 times, such as at least 8 times, most preferably said one or more aqueous dispersion in a) is present in an amount at least 9 times or 10 times the amount of said one or more polyisocyanate in b) based on weight;

In a preferred embodiment of all aspects, said coating composition comprises a) a primary composition comprising one or more aqueous dispersion of an aliphatic polyurethane; wherein said aqueous dispersion has a particle size characterized by a D50 (median) value below 1000 nm, such as below 900 nm, such as below 800 nm, such as below 700 nm, such as below 600 nm, preferably below 500 nm, such as below 400 nm or 300 nm, more preferably below 200 nm, such as below 100 nm;

and optionally b) a secondary composition comprising one or more polyisocyanates;

wherein when the coating composition comprises b) then said one or more aqueous dispersion in a) is present in an amount of at least 5 times the amount of said one or more polyisocyanate in b), preferably at least 6 times, such as at least 7 times, such as at least 8 times, most preferably said one or more aqueous dispersion in a) is present in an amount at least 9 times or 10 times the amount of said one or more polyisocyanate in b) based on weight;

when b) is absent then the coating composition is a one-component composition.

In a preferred embodiment of all aspects, said a) primary composition comprises i) one or more aqueous dispersion of an aliphatic polyurethane based on polyester diols; and/or ii) one or more aqueous dispersion of an aliphatic polyurethane based on polycarbonate diols.

In a preferred embodiment of all aspects, said coating composition comprises a) a primary composition comprising one or more aqueous dispersion of an aliphatic polyurethane; wherein said primary composition comprises i) one or more aqueous dispersion of an aliphatic polyurethane based on polyester diols; wherein said aqueous dispersion has a particle size characterized by a D50 (median) value below 1000 nm, such as below 900 nm, such as below 800 nm, such as below 700 nm, such as below 600 nm, preferably below 500 nm, such as below 400 nm or 300 nm, more preferably below 200 nm, such as below 100 nm; and/or ii) one or more aqueous dispersion of an aliphatic polyurethane based on polycarbonate diols; wherein said aqueous dispersion has a particle size characterized by a D50 (median) value below 1000 nm, such as below 900 nm, such as below 800 nm, such as below 700 nm, such as below 600 nm, preferably below 500 nm, such as below 400 nm or 300 nm, more preferably below 200 nm, such as below 100 nm;

and optionally b) a secondary composition comprising one or more polyisocyanates;

wherein when the coating composition comprises b) then said one or more aqueous dispersion in a) is present in an amount of at least 5 times the amount of said one or more polyisocyanate in b), such as at least 6 times, preferably at least 7 times, such as at least 8 times, most preferably said one or more aqueous dispersion in a) is present in an amount at least 9 times or 10 times the amount of said one or more polyisocyanate in b) based on weight;

when b) is absent then the coating composition is a one-component composition.

Aqueous Dispersion

Throughout the application, the terms "aqueous dispersion of polyurethane", "aqueous polyurethane dispersion", "polyurethane dispersion" and "aqueous dispersion of an aliphatic polyurethane" and the like are used interchangeably and intended to indicate "aqueous dispersion of an aliphatic polyurethane". The term "Polyurethane" may be abbreviated "PU".

In the context of the present invention, the aqueous dispersions are dispersions of polyurethane resins. Aqueous dispersions of polyurethane, are disperse systems in which water is present as a continuous phase (dispersion medium) and the polyurethane resin is present as a phase dispersed in the continuous phase (disperse phase).

Polyurethane dispersions can be produced by methods known in the art. The polyurethane dispersions according to the invention preferably comprise fully reacted polyurethanes prepared by reacting diols (—OH), of for example a polyester diol or a polycarbonate diol, with isocyanates (—NCO) to create a urethane prepolymer which is then poured and dispersed in water while a chain extension process is taken place. The polyurethane dispersions are neutralized with an amine such as for example triethylamine.

The polyurethane dispersions according to the invention typically comprises i) one or more aqueous dispersion of an aliphatic polyurethane based on polyester diols; and/or ii) one or more aqueous dispersion of an aliphatic polyurethane based on polycarbonate diols.

For the hydrophilic stabilization and/or for the generation of dispersibility in an aqueous medium, a polymeric resin may comprise, for example, certain ionic groups and/or groups which can be converted into ionic groups (potentially ionic groups). Nonionic hydrophilic modifying groups may likewise be present.

An aqueous dispersion according to i) may be prepared by reacting-OH groups of polyester diols with (—NCO) groups of isocyanates creating a prepolymer that is poured and dispersed in water while a chain extension process takes place. Likewise, an aqueous dispersion according to ii) may be prepared by reacting-OH groups of polycarbonate diols with (—NCO) groups of isocyanates creating a prepolymer that is poured and dispersed in water while a chain extension process takes place. Preferably, the polyurethanes comprised in the one or more aqueous dispersions have been fully reacted meaning that they do not contain free/available-NCO groups.

Water based polyurethane based paint systems have been described in general for example by Müller and Poth in *Coatings Formulation: An International Textbook,* 3rd Edition; Hanover: Vincentz Network 2017; European Coatings// Library.

Aqueous polyurethane dispersions and methods for their preparation have been disclosed in for example WO 2011/124602 and WO 2018/172526. Further general information about aqueous dispersions for coating compositions, and their preparation, can be found in Müller and Poth; *Coatings Formulation: An International Textbook,* 3rd Edition; Hanover: Vincentz Network 2017; European Coatings//Library.

Aqueous polyurethane dispersions suitable for use according to the present invention includes Esacote® PU 40 and Esacote® PU 77 from Lamberti S.p.A, Italy, which are anionic waterborne dispersions of aliphatic polyurethane based on polyester diols and polycarbonate diols. These products are typically used for coatings on metal and wood for decorative purposes. Other examples are Bayhydrol US 2558 and Bayhydrol US 2891 from Covestro, Leverkusen, Germany.

The polyurethane dispersions applied according to the present invention can be anionic, cationic or nonionic. In a preferred embodiment, said aqueous polyurethane dispersion is an anionic aqueous polyurethane dispersion.

Features of the Aqueous Polyurethane Dispersion

The inventors have identified certain preferred features of the polyurethane dispersions that may impact the performance of the final coating compositions, in particular the rain erosion resistance of the topcoat. Coating compositions prepared with various polyurethane dispersions have been tested for rain erosion resistance (see tables 5a and 5b and FIG. 1) and the performance has been classified according to FIG. 2. For the polyurethane dispersions applied in the examples the particle size distribution and glass transition temperature have been measured (Table 4). Likewise, tensile strength and elongation at break has been tested for clear films of the dispersions (Table 3 and 4).

In particular the particle size distribution seems to have an impact of the rain erosion resistance of the topcoat. The polyurethane dispersion should preferably have a D50 (median) value below 1000 nm, such as below 900 nm, such as below 800 nm, such as below 700 nm, such as below 600 nm, preferably below 500 nm, such as below 400 nm or 300 nm, more preferably below 200 nm, such as below 100 nm when measured as described in the example section herein.

The glass transition temperature (Tg) should preferably be below 10° C., such as below 0° C. when measured as described in the example section herein.

The elongation at break of a clear film prepared from the polyurethane dispersion is preferably at least 100%, such as at least 120, 140, 160, 180, preferably at least 200%, or at least 250%, such as at least 300% or at least 350%, or least 400%, when measured as described in the example section herein. The tensile strength at break of a clear film prepared from the PU dispersion is preferably at least 10 MPa, such as at least 15 Mpa, such as at least 20 Mpa, such as in the range of 20 to 60 mPa, when measured as described in the example section herein. Preferably, a clear film prepared from the PU dispersion has an elongation at break of at least 200% combined with a tensile strength of at least 20 MPa.

The minimum film forming temperature (MFFT) of the aqueous polyurethane dispersions is typically in the range of −10 to 50° C. For example, the MFFT of the polyurethane dispersion may be in the range of −5 to 45° C., such as in the range of 0 to 40° C., such as in the range of 5 to 35° C. The viscosity of polyurethane dispersions is typically in the range of 5 mPa*s to about 5000 mPa*s such as in the range of 100-2000 mPa*s.

Polyurethane

The polyurethane dispersions according to the present invention are aqueous dispersions of aliphatic polyurethanes which are typically based on polycarbonate diols and/or polyester diols.

Polycarbonate diols may be obtained for example by reacting carbonic acid derivatives, such as dialkyl carbonates, e.g. dimethyl carbonate, or phosgene, with diols. Suitable diols include ethylene glycol, 1,2- and 1,3-propanediol, 1,3- and 1,4-butanediol, 1,5-pentanediol, 1,6-hexanediol, cyclohexane dimethanol, diethylene glycol, dipropylene glycol, neopentylglycol and mixtures thereof.

Polyester diols can obtained, for example, by reacting aliphatic or cycloaliphatic dicarboxylic acids, or possibly the corresponding anhydrides, with diols, optionally in the presence of known esterification catalysts. Examples of suitable dicarboxylic acids include adipic, glutaric, pimelic, suberic, nonanedicarboxylic, decanedicarboxylic, succinic, maleic, sebacic, azelaic, terephthalic, isophthalic, o-phthalic, tetrahydrophthalic, hexahydrophthalic, trimellitic, 1,4-cyclohexanedicarboxylic acid; examples of suitable anhydrides include succinic, o-phthalic and trimellitic anhydride; various commercially available dimeric fatty acids in saturated (hydrogenated) or unsaturated form may also be used as the dicarboxylic acid.

Examples of suitable diols for the preparation of the polyester diols are ethanediol, di-, tri-tetraethylene glycol, 1,2 propanediol, di-, tri-, tetrapropylene glycol, 1,3-propanediol, 1,4-butanediol, 1,3-butanediol, 2,3-butanediol, 1,6-hexanediol, 1,5-pentanediol, 2,2-dimethyl-1,3-propanediol, 1,4-dihydroxycyclohexane, 1,8-octanediol, 1,10-decanediol, 1,12-decanediol, 2,2,4- and/or 2,4,4-trimethyl-1,3-pentanediol.

Other useful polyester diols are those obtainable from diol initiated polymerization of hydroxy carboxylic acids containing from about 2 to 26 carbon atoms or a lactone thereof. The hydroxy carboxylic acids may be saturated or unsaturated, linear or branched. Examples of suitable hydroxy carboxylic acids include glycolic acid, lactic acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid and 4-hydroxydecanoic acid.

Isocyanates useful for the preparation of the polyurethane referred to above are typically aliphatic or cycloaliphatic diisocyanates or mixtures thereof. Examples include diisocyanates such as for example 1-isocyanate-3-isocyanate-methyl-3,5,5-trimethylcyclohexane (or isophoronediisocyanate), 4,4'-dicyclohexyl-methane-diisocyanate, hexamethylenediisocyanate, and mixtures thereof.

In a preferred embodiment, the polyurethane contained in said one or more aqueous dispersion does not comprise any fluorine atoms.

Aqueous and Water Based

In view of the ever growing requirements imposed on the environmental profile of coating compositions, it is desirable that these compositions include a smallest possible fraction of organic solvents. The coating composition of the present invention is "water based" which refers to a system wherein the solvent comprises a significant fraction of water. Likewise, an "aqueous" dispersion refers to a dispersion (of polyurethane particles) which comprises a significant fraction of water and an insignificant amount of solvent, if any.

In the context of the present invention, the coating composition comprises at least 30 wt % of water, such as a least 35 wt %, preferably at least 40 wt % of water, based on the total weight of the system.

It is preferred, moreover, for the fraction of organic solvents in the coating composition to be less than 10 wt %, preferably less than 5 wt %, such as less than 4, 3, 2, 1 or 0.5 wt %, based on the total weight of the coating composition. It may be beneficial to add include a small amount of solvent in the primary and/or the optional secondary composition. Most preferably, both the primary and the optional secondary compositions are substantially free of any organic solvents meaning that one or more organic solvents has not been explicitly added in order, for example, to adapt the viscosity of the composition. Thus, in the present context, a composition being "substantially free of any organic solvents" means that, if at all, only small amounts of one or more organic solvents are present in the composition as a result of the use of for example typical coatings additives, which may be optionally obtained commercially in solution in organic solvents. In a preferred embodiment, the coating composition is free of any organic solvent.

An aqueous polyurethane dispersion according to the invention preferably comprises, based on its overall weight, at least 40 wt % of water, such as at least 45 wt %, preferably at least 50 wt %, in some instances at least 60% of water. Although the dispersion is aqueous, there may sometimes be a minor fraction of organic solvents present in the dispersion. The fraction of organic solvents, based on their total weight, is less than 5 wt %, such as less than 2 wt %, such as less than 1 wt %, such as less than 0.5 wt % of the aqueous dispersion. In one embodiment, said one or more aqueous dispersion is substantially free of any organic solvent.

Coating Composition

The water based coating compositions of the present invention comprises one or more aqueous dispersion of an aliphatic polyurethane.

In one embodiment, the coating compositions of the present invention comprises a) a primary composition comprising one or more aqueous dispersion of an aliphatic polyurethane, and optionally b) a secondary composition comprising one or more isocyanates. When the secondary composition is present in the coating composition, the weight ratio between the one or more aqueous dispersion in the primary composition and the one or more polyisocyanates in the secondary composition is so that said one or more aqueous dispersion in a) is present in an amount of at least 5 times the amount of said one or more polyisocyanate in b), such as at least 6 times, such as at least 7 times, such as at least 8 times, preferably said one or more aqueous dispersion in a) is present in an amount at least 9 times or 10 times the amount of said one or more polyisocyanate in b) based on weight.

Preferably, said aqueous dispersion has a particle size characterized by a D50 (median) value below 1000 nm, such as below 900 nm, such as below 800 nm, such as below 700 nm, such as below 600 nm, preferably below 500 nm, such as below 400 nm or 300 nm, more preferably below 200 nm, such as below 100 nm;

When composition b) is present in the coating composition, the isocyanate acts as an additive e.g. to provide a better abrasion resistance of the topcoat. The isocyanate is not intended for use as a crosslinker reacting with the polyurethane.

The secondary composition b) being an optional constituent of the coating composition implicitly means that in a preferred embodiment, the coating composition is a one-component composition which does not comprise the secondary composition. Thus, in one embodiment the coating composition only consists of the primary composition.

Typically the coating composition further includes a number of other constituents, e.g. fillers and pigments and additives (and optionally minor amounts of solvent as mentioned earlier).

It should be understood that when reference is made to the "coating composition", it is the final composition before application on the wind blade. Thus when for example the coating composition comprises both the primary composition and the secondary composition, reference is made to the mixed composition ready to be applied to the wind blade.

Film formation of the coating composition takes place after application to the wind blade by evaporation of water, typically at ambient temperature and humidity.

The coating compositions claimed in the present invention ideally possess physicochemical properties making the compositions suitable for application on a wind blade for providing a coat that protects against rain erosion. Furthermore, the coat obtained from the coating compositions is preferably suitable for having a leading edge protection coat on top of the coat or having a leading edge protection coat underneath the coat, which necessitates a good adhesion between the claimed coat and the leading edge protection coat.

The coating composition according to the invention typically has a viscosity in the range of 90-115 Krebs Units (KU) measured at 25° C. according to ASTM D562.

The minimum film forming temperature (MFFT) of the coating composition should preferably be in the range of 0 to 30° C. For example, the MFFT of the coating composition may be in the range of 0 to 25° C., such as in the range of 0 to 20° C. MFFT can be determined for example by the method according to ISO 2115.

The dry hard time for the coating composition is typically achieved in the range of 15 to 180 minutes, such as in the rate of 30 to 180 minutes, such as in the range of 30 to 120 minutes, such as 30 to 90 minutes, such as 40 to 60 minutes measured at 23° C. and 50% humidity in accordance with ISO 9117-4.

The coats obtained from the claimed coating compositions typically show an elongation at break in the range of about 50% to about 250%. Preferably, the elongation at break is at least 100%, such as at least 120% or 140% or 160%, preferably at least 180%. The tensile strength at break of the coat is typically in the range of about 5 MPa to about 30 MPa, preferably at least 10 MPa.

Primary Composition

The primary composition according to the invention comprises one or more aqueous dispersion of an aliphatic polyurethane, such as one or more aqueous dispersion of an aliphatic polyurethane based on polyester diols; and/or one or more aqueous dispersion of an aliphatic polyurethane based on polycarbonate diols.

The fraction of the one or more aqueous polyurethane dispersion based on the total weight of the primary composition, may vary and is dependent, for example, on the level of the solids content in the dispersion.

The aqueous polyurethane dispersion is typically present in the primary composition in an amount of between 30-70 wt %, based on the total weight of the primary composition. For example, the polyurethane dispersion may advantageously be present in an amount of 40-70 wt % present, preferably about 50-70 wt %, such as about 55-65 wt % of the primary composition.

The solids content of the polyurethane dispersion is generally between 20 to 60 wt %, based on the total weight of the polyurethane dispersion. For example, the solids content of the polyurethane dispersion may be between 20 to 50 wt %, such as between 20 to 45 wt %, such as between 20 to 40 wt % such as between 20 to 30 wt % or between 30 to 40 wt %.

Therefore, the amount of polyurethane resin in the primary composition is generally in the span of about 5-50 wt %, based on the total weight of the primary composition. For example, the amount of polyurethane resin in the primary composition may be in the range of about 5-40% or about 10-50%, such as in the range of about 10-40 wt % or 10-30 wt % or 20-40 wt %. A person skilled in the art can easily calculate the amount of polyurethane resin in the primary composition by multiplying the amount of polyurethane dispersion in the primary composition by the solids content of the polyurethane dispersion.

In a preferred embodiment, the primary composition a) comprises i) one or more aqueous dispersion of an aliphatic polyurethane based on polyester diols; and/or ii) one or more aqueous dispersion of an aliphatic polyurethane based on polycarbonate diols.

Optional Secondary Composition

The inventors have observed that adding a minor amount of polyisocyanate to the primary composition may improve certain (mechanical) properties such as providing a better abrasion resistance of the coat. Thus, the claimed coating composition optionally further comprises a secondary composition comprising one or more polyisocyanates.

Contrary to conventional two-component coating compositions, the content of polyisocyanate in the coating composition in the present context only constitutes a very minor amount relative to the polyurethane dispersion. Typically, the one or more aqueous polyurethane dispersion comprised in the primary composition and the one or more polyisocyanate comprised in the secondary composition are present in a weight ratio of so that said one or more aqueous dispersion in a) is present in an amount of at least 5 times the amount of said one or more polyisocyanate in b), such as at least 6 times, such as at least 7 times, such as at least 8 times, preferably said one or more aqueous dispersion in a) is present in an amount at least 9 times or 10 times the amount of said one or more polyisocyanate in b) based on weight. Without being bound by theory, it is believed that the reactive-NCO groups react with available free carboxylic moieties and/or water or other available free hydroxylic moieties that may be present in the aqueous dispersion. The isocyanate is not intended for use as a crosslinker reacting with the polyurethane.

The polyisocyanate in the secondary composition described herein should not be confused with the isocyanates use for the preparation of the polyurethane in the aqueous dispersion.

In the present context, the "polyisocyanate" in the secondary composition refers to organic compounds that have two or more reactive isocyanate (—NCO) groups in a single molecule such as diisocyanates, triisocyanates, tetraisocyanates, etc., and mixtures thereof. Cyclic and/or linear polyisocyanate molecules may usefully be employed. The number of isocyanate groups per molecule is readily determinable via the isocyanate content and the number-average molecular weight of the respective polyisocyanate. The isocyanate content can be determined for example in accordance with DIN EN ISO 11909 by reaction of the respective sample with excess dibutylamine and back-titration of the excess with hydrochloric acid against bromophenol blue.

Examples of polyisocyanates comprised in the secondary composition are compounds that are known per se, preferably aliphatic polyisocyanates with particular mention of diisocyanates and their dimers and trimers such as uretdiones and isocyanurates. Examples include derivatives of hexamethylene-1,6-diisocyanate (also denoted hexamethylene diisocyanate or HDI), octamethylene diisocyanate, decamethylene diisocyanate, dodecamethylene diisocyanate, tetradecamethylene diisocyanate, trimethylhexane diisocyanate, tetramethyl-hexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanato-methyl)

cyclohexane, 1,4- or 1,3- or 1,2-diisocyanato-cyclohexane, and 2,4- or 2,6-diisocyanato-1-methyl-cyclohexane, and mixtures of these.

Also, reaction products or prepolymers of aliphatic polyisocyanates may be utilized. Particular mention is made of biurets, allophohanates, uretdiones and isocyanurates of the stated polyisocyanates. Preference here is given to using the dimers and/or trimers of the stated polyisocyanates, preferably of hexamethylene diisocyanate. Thus, in particular, the uretdiones and isocyanurates of the abovementioned polyisocyanates, that are known per se and also available commercially. In one embodiment, said secondary composition comprises a prepolymer based on an aliphatic polyisocyanate, preferably based on hexamethylene diisocyanate (HDI). “Prepolymers” in the context of the invention, are NCO-functional reaction products of isocyanates and polyols, such as polyethers or polyesters.

Preferred polyisocyanates are solvent-free and are substantially free of isocyanate monomer, i.e. contains less than 0.5% and more preferably less than 0.3% of isocyanate monomer as measured according to DIN EN ISO 10 283.

Examples of commercially available polyisocyanates which are useful within the present invention include Bayhydur® XP 2547 and Desmodur® E 2863 XP available from Covestro Deutschland A G, Leverkusen, Germany; Basonat H A 2000 available from BASF, Germany; and Crosslinker 08 available from Lamberti S.p.A, Italy. It is a pre-requisite that the polyisocyanate works in a water based system and is compatible with the polyurethane dispersion. In a preferred embodiment, said polyisocyanate is water dispersible.

In the context of the invention, the secondary composition b) is an optional constituent in the coating composition. In the absence of the secondary composition, the coating composition is understood to be a one-component composition.

Preparation of the Coating Composition of the Invention

The coating compositions can be prepared from commercially available components. The primary composition and the secondary composition may typically also comprise one or more other constituents, e.g. fillers, pigments and additives (e.g. thickening agents, wetting agents, dispersing agents, anti-sag agents, anti-settling agents, defoamers, and stabilizers), and sometimes minor amounts of solvent as previously mentioned.

Preferably, the primary composition is prepared in two steps. In the first step the dispersion of the pigment in water, stabilizer, thickener and auxiliary solvents, so-called mill base, is prepared. In the second step the mill base is blended with polyurethane dispersion to obtain the final coating composition.

In a preferred embodiment, the coating composition comprises one or more further components selected from fillers, pigments and additives.

Examples of fillers and pigments are calcium carbonate, dolomite, talc, mica, barium sulfate, kaolin, silica, titanium dioxide, red iron oxide, yellow iron oxide, black iron oxide, carbon black, phthalocyanine blue and phthalocyanine green. The total amount of filler(s) and pigment(s) is preferably between about 30-50% such as about 35-45% of filler(s) and pigment(s) by weight of the coating composition.

Examples of additives are diluents, wetting agents, levelling agents and dispersants; defoaming agents such as silicone oils; stabilisers such as stabilisers against light and heat, e.g. hindered amine light stabilisers (HALS); stabilisers against moisture (water scavengers) such as substituted isocyanates, substituted silanes, ortho formic acid trialkyl esters and synthetic zeolites; stabilisers against oxidation such as butylated hydroxyanisole and butylated hydroxytoluene; thickeners and anti-settling agents such as organo-modified clays (Bentone), polyamide waxes and polyethylene waxes.

The solids content of the coating composition is generally between 20 to 70 wt %, based on the total weight of the coating composition. For example, the solids content of the coating composition may be between 30 to 70 wt %, such as between 40 to 70 wt % such as between 50 to 70 wt % or 50 to 60 wt %.

The coating composition may be prepared by suitable techniques that are commonly used within the field of coating production. When the coating composition comprises the secondary composition, the coating composition is typically prepared by mixing two pre-mixtures whereof one pre-mixture comprises the primary composition and one pre-mixture comprises the secondary composition. Prior to mixing one or both of the pre-mixtures may be preconditioned to meet specific temperature requirements. It should be understood in this context that when reference is made to the coating composition, it is the mixed coating composition. The mixing ratio between the primary and secondary compositions must be carefully controlled in order to obtain a coating composition with the right physical properties. The mixing ratio is defined as the volumetric or weight ratio between the primary composition and the secondary composition. In the context of the present invention, when the coating composition comprises the secondary composition the mixing ratio in weight between the primary composition and the secondary composition is typically at least 10:1, such as at least 15:1; or the mixing ratio is between 10:1 and 40:1, such as between 10:1 and 30:1, such as between 10:1 and 25:1, preferably between 10:1 and 20:1, such as between 15:1 and 20:1.

Application of the Coating Composition of the Invention

Application of the coating compositions can be done by standard application methods such as by spray or roller application.

The coating composition of the invention is applied on a wind blade to provide a topcoat on said wind blade. The wind blade is typically prepared from epoxy glass fiber reinforced plastic laminate. Preferably, the coating composition is applied in one or more layers such that the total dry film thickness (dft) of the coating is between 25-400 μm, such as between 35-200 μm or between 25-100 μm, or preferably between 50-250 μm, such as between, 50-175 μm, such as between 50-125 μm or 70-110 μm. By roller application, a dft as low as about 35 μm can typically be obtained by application of one layer.

Also preferably, the part of the outer surface of the wind blade coated with the coating composition comprises at least a predominant portion of the wind blade, but usually the total surface of the wind blade can be coated with the coating composition.

In the present context, the term “topcoat” refers to a coating layer applied to at least a part of a wind blade, preferably to the entire wind blade. In the context of the invention, the wind blade to which the coating composition is applied is typically pre-coated with one or more layers comprising a putty and/or a primer to which the topcoat coating composition is applied.

Preferably, the topcoat is included in a multilayer coating system comprising

A) a putty layer obtained applied on the outer surface of the substrate; and

B) optionally a primer layer applied on the putty layer; and

C) one or more coating layer prepared from a coating composition according to invention; and D) optionally a leading edge protective coating layer covering at least a part of the wind blade such as at least a part of the leading edge of the wind blade; wherein said topcoat is constituted by the one or more coating layer C).

A pore filler may be applied on top of the putty layer A) before applying the one ore more coating layer C) and/or on top of the outermost one or more coating layer C) before applying the leading edge protection coat.

One non-limiting example of a putty composition suitable for wind blades is disclosed in WO 2022/136554.

Although the topcoat according to the present invention provides a good protection against harsh weather conditions including resistance towards rein erosion it may in some instances be relevant on the leading edge of the wind blade to supplement the topcoat with a leading edge protection coating. Thus, in one embodiment, the coated wind blade has a “leading edge protection coat” applied on the topcoat of the invention or a leading edge protection coat has been applied on the wind blade underneath the topcoat. The leading edge protection coating is typically applied to at least a part of a wind blade including at least to the leading edge or at least to a part of the leading edge of a wind blade to provide further protection against erosion caused by for example rain, hail, ice, UV, water absorption and other weather conditions. The “leading edge” of a wind blade indicates the portion of the blade that first cuts into the wind. (The opposite edge can be denoted “the trailing edge”). Leading edge protection coatings are particularly useful for providing protection against erosion at the leading edge of the wind blade which is the part of the wind blade that first cuts into the wind and is most exposed to erosion. Leading edge protection coating compositions for wind blades are known in the art; one non-limiting example is the leading edge protection coating composition disclosed in WO 2020/260578.

Hence, the present invention also provides a method of coating a wind blade, said method comprising applying a coating composition as defined herein to at least a part of the outer surface of said wind blade; and allowing the coating composition to form a film.

In a preferred embodiment, said coating composition is applied by spray or roller application. In a preferred embodiment, said coating composition is applied in one or more layers such that the total dry film thickness of the coating is between 35-200 μm, such as between 50-175 μm, preferably between about 70 to 110 μm.

After application of the coating composition to the wind blade, film formation is allowed to take place by physical drying (evaporation of water) at ambient temperature and humidity, preferably at a temperature not exceeding 40° C., in particular at a temperature in the range of 10-35° C., such as a temperature in the range of 15-30° C., preferably between 20-25° C. The actual temperature for the film formation is normally set at the lower limit by the temperature at which film formation is practically obtainable and at the upper limit by the temperature at which the integrity of the wind blade and any underlying coats will be compromised.

The relative humidity where film formation takes place is preferably between 20-85%, such as between 30-70%, such as between 35-65%, preferably between 40-60% relative humidity.

The coating compositions of the present invention may also be used in a method for repairing a wind blade. The method for repairing a wind blade would comprise a step of applying the coating composition of the present application to at least a portion of the wind blade. The coating can be applied to substantially all of the wind blade, or just to a portion of the wind blade. In certain embodiments, one or more of the coating layers can be applied to at least a portion of the wind blade. The wind blade repaired in this manner can have a pre-existing coating or coating layers, some or all of which may be removed prior to application of the claimed coating composition. Alternatively, the claimed coating composition could be painted over the existing coating layer(s).

Thus, the invention also relates to a method for repairing and/or replacing or partly replacing an existing coating layer on a wind blade. In one embodiment, said wind blade has one or more pre-existing coating layers, which are at least partly removed prior to application of said coating composition in a further embodiment, said one or more pre-existing coating layers are completely removed prior to application of said coating composition.

The Topcoat

Preferred features of the wind blade topcoat obtained by the claimed coating composition are—in addition to a high degree of flexibility—cohesion of the film, UV-resistance, gloss retention and adhesion. Furthermore, the coat obtained by the claimed coating composition, provides good protection against erosion caused by harsh weather conditions. Thus, in a preferred embodiment, the use of the coating composition is for providing an erosion resistant topcoat on a wind blade.

One way to assess the effectiveness against rain erosion is by the Rain Erosion Test (RET) with the test conditions described in the experimental section herein. In one embodiment, an erosion resistant coat indicates a coat that provides at least a “fair” resistance, preferably a “good” resistance against rain erosion according to the classifications “good”, “fair and “poor” according to FIG. 2 when applied with a total dry film thickness (dft) in the range of 220-250 μm and assessed according to the Rain Erosion Test method described herein. (See also v/N curves in FIG. 1 and further explanation in the example section).

Although the topcoat in itself provides a resistance against erosion, it may be relevant to supplement the topcoat on the leading edge with a leading edge protection coat. It is therefore preferred that the claimed coating composition provides a topcoat that is suitable for having a leading edge protection coating either directly underneath or on top of the topcoat, i.e. that the surface of the topcoat is suited for that purpose.

In the present context the terms “erosion protection” and “erosion resistance” and the like do not indicate complete prevention of the underlying substrate from erosion. The terms typically indicate that the topcoat and/or leading edge protection coat delays and/or alleviates the erosion of the underlying structure (wind blade) caused by rain and hail etc.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

The use of the terms "a" and "an" and "the" and similar referents in the context of describing the invention are to be construed to cover both the singular and the plural, unless otherwise indicated herein or clearly contradicted by context. For example, the phrase "the composition" is to be understood as referring to various "compositions" of the invention or particular described aspect, unless otherwise indicated.

The description herein of any aspect or aspect of the invention using terms such as "comprising", "having," "including" or "containing" with reference to an element or elements is intended to provide support for a similar aspect or aspect of the invention that "consists of", "consists essentially of" or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

The use of any and all examples, or exemplary language (including "for instance", "for example", "e.g.", and "such as") in the present specification is intended merely to better illuminate the invention, and does not pose a limitation on the scope of invention unless otherwise indicated.

Headings and sub-headings are used herein for convenience only, and should not be construed as limiting the invention in any way. The use of any and all examples, or exemplary language (including "for instance", "for example", "e.g.", and "such as") in the present specification is intended merely to better illuminate the invention, and does not pose a limitation on the scope of invention unless otherwise indicated. The citation and incorporation of patent documents herein is done for convenience only, and does not reflect any view of the validity, patentability and/or enforceability of such patent documents.

It should be understood that the various aspects, embodiments, implementations and features of the invention mentioned herein may be claimed separately, or in any combination.

EXPERIMENTAL

The invention will be illustrated by the following non-limiting examples.

Raw Materials

Water based coatings comprising five different polyurethane dispersions and two acrylic emulsions (comparative) has been tested Tables 1 and 2 below indicate the identity of the polyurethane dispersions, acrylic emulsions and polyisocyanates applied in the examples.

TABLE 1a

Polyurethane dispersions applied in the examples (Esacote series available from Lamberti S.p.A, Italy; Bayhydrol series available from Covestro, Germany)

| PU dispersion | Description |
|---|---|
| Esacote ® PU 40 | Anionic waterborne dispersion of an aliphatic polyurethane based on polyester diols. |
| Esacote ® PU 77 | Anionic waterborne dispersion of an aliphatic polyurethane based on polycarbonate diols. |
| Esacote ® PU 940 (comparative) | Anionic waterborne dispersion of an aliphatic polyurethane based on polycarbonate diols |
| Bayhydrol UH 2558 | Aliphatic, anionic polyurethane dispersion |
| Bayhydrol UH 2891 | Anionic aliphatic polyester-polyurethane dispersion |

TABLE 1b

Acrylic emulsions applied in the comparative examples (Neocryl available from Covestro, Germany and Acronal Pro available from BASF, Germany)

| Acrylic emulsion | Description |
|---|---|
| Neocryl XK-540[i)] | Polyurethane-modified acrylic emulsion |
| Acronal Pro 7600X [ii)] | Styrene acrylic emulsion |

TABLE 2

Polyisocyanates applied in the examples (supplier information)

| Isocyanate | Description | Isocyanate content (%) | Functionality (n) | Viscosity (mPa*s) |
|---|---|---|---|---|
| Bayhydur XP 2547 (Covestro, Germany) | Hydrophilic aliphatic polyisocyanate based on hexamethylene diisocyanate (HDI). Hardener for waterborne two-component polyurethane coatings. | 22.5 | 3.0 | 650 |
| Desmodur E 2863 XP (Covestro, Germany) | Polyester-modified polyisocyanate prepolymer based on hexamethylene-1,6-diisocyanate (HDI) | 11.0 | 2.2 | 1350 |
| Basonat HA 2000 (BASF, Germany) | Allophanate-modified polyisocyanate based on isocyanurated hexamethylene diisocyanate, solvent-free | 18.5-21.5 | 2.9 | 500-900 |

TABLE 2-continued

| Polyisocyanates applied in the examples (supplier information) | | | | |
|---|---|---|---|---|
| Isocyanate | Description | Isocyanate content (%) | Functionality (n) | Viscosity (mPa*s) |
| Crosslinker 08 (Lamberti S.p.A, Italy) | Water dispersible aliphatic polyisocyanate in propylene carbonate | 10.4-12.4 | unknown | <300 |

Characterisation of Polyurethane Dispersions and Acrylic Emulsions

The PU dispersions and the comparative acrylic emulsions were characterized by particle size glass transition (Tg), and clear thin films of the dispersions were characterized by glass transition temperature and tensile strength.

1. Particle Size Measurement Determined by Laser Light Scattering

The commercial polyurethane dispersions and acrylic emulsions were used directly as water based samples for particle size measurement and Tg measurement. The particle sizes of the dispersed polyurethane particles in the water based samples were measured using a Malvern Mastersizer 3000 laser scattering system with the Hydro LV liquid sample module-water was used as the solvent.

A sample of the water based polymer was added to the sample module until the appropriate dilution was reached with a stable obscuration.

Light scattering data was collected and analyzed using the Mastersizer software, yielding values for the particle size of the samples in nanometers given as the 10th, 50th and 90th percentiles: Dx(10), Dx(50) and Dx(90).

2. Glass Transition Temperature (Tg) Measured by DSC

The Tg was measured for the water based samples using a Perkin Elmer Pyris 1 Differential scanning calorimeter (DSC).

Water based samples were weighed into DSC cups and dried, and then reweighed to ascertain the polymer sample weight. A sample was sealed in a DSC cup and loaded into the DSC chamber alongside a reference. The DSC programme was used to cycle the sample & reference through two heat and cool stages between −60° C. and +80° C., at a heating rate of 10° C. per minute.

Perkin Elmer Pyris software was used to analyze the thermal transitions of the samples, to identify the Glass transition onset and mid-point.

3. Elongation at Break and Tensile Strength

A measurement of how much elongation (or strain) is withstood before breaking in a free film sample. The elongation (or strain) is defined as the increase in length per unit original length of the gauge, expressed as a dimensionless ratio, or in percentage (%). Elongation above 400% is not measurable.

Tensile modulus and other aspects of the tensile stress/strain relationship (including elongation at break) was measured according to ISO 527-3, which specifies the conditions for determining the tensile properties of plastic films or sheets less than 1 mm thick, based on upon the general principles given in ISO 527-1, using a Zwick Tensile testing Machine Z2.5/TS1S-2000

Test specimens were prepared according with the type 5 geometry parameters, with 10 mm width and 150 mm overall length. The initial distance between grips was (100±5) mm or, in the case the films had an elongation at break outside the equipment capabilities, (50±2.5) mm.

Thin Film Compositions for Measurement of Tensile Strength and Elongation at Break For measuring the, tensile strength and elongation at break the creation of a clear film is necessary. In the current examples, the aqueous dispersions or emulsions were mixed with 5-10% Solvent and 0.5-1% additives like defoamer and wetting agent. Creation of the clear films further necessitated addition a small amount of isocyanate.

After mixing, a draw of the binder solution was made on a foil, and after drying the free film was removed and cut into pieces for testing. Dry film thicknesses of the films were in the range of about 30-100 μm General composition of the free films are listed in Table 3. For all thin films, 100 parts (weight) of PU dispersion or acrylic emulsion were used. Weights of the other constituents are given in the table.

TABLE 3

| Thin film compositions for tensile strength and elongation at break | | | | | | |
|---|---|---|---|---|---|---|
| PU dispersion/ acrylic emulsion | Wetting and dispersing agent | Defoamer | Organic solvent | Basonat HA 2000 | Desmodur E2863 XP | Cross-linker 08 |
| Neocryl XK-540 | 0.7 | 0.06 | 6.5 | 15 | 15 | — |
| Esacote ® PU 40 | 0.6 | 0.05 | 10 | 5 | 5 | — |
| Esacote ® PU 77 | 0.6 | 0.05 | 10 | 5 | 5 | — |
| Esacote ® PU 940 | 0.6 | 0.05 | 10 | 5 | 5 | — |
| Bayhydrol UH 2558 | — | — | 10 | — | — | 10 |
| Bayhydrol UH 2891 | — | — | 10 | — | — | 10 |
| Acronal Pro 7600 | — | 0.05 | 3.2 | — | — | — |
| Parameter ranges for claimed PU dispersions | | | | | | |
| | | | | Isocyanate | | |
| 100 | 0-0.6 | 0-0.05 | 3-10 | 10 | | |

Table 4 indicates material properties of the PU dispersions and acrylic emulsions applied in the examples (examples of the invention and comparative examples). Particle size distribution, glass transition temperature (Tg), elongation at break and tensile strength have been measured according to the descriptions above.

TABLE 4 material properties of PU dispersions and acrylic emulsions applied in the examples

| PU dispersion/ acrylic emulsion | Particle size D(50)-Median (nM) | Tensile strength [Fm (Mpa)] | Elongation at break (%) | Tg onset (° C.), measured | Tg (° C.), supplier information |
|---|---|---|---|---|---|
| Esacote ® PU 40 | <50 | 32.6 | 213 | −40.7 | −35.8 |
| Esacote ® PU 77 | 89 | 27.8 | 127 | −20 | −17.6 |
| Esacote ® PU 940 | 3730 | 26.5 | 136 | −29.9 | unknown |
| Bayhydrol UH 2558 | 95 | 31.1 | 218 | n.a. | −60 |
| Bayhydrol UH 2891 | 114 | 52.1 | >400* | n.a | −55 |
| Neocryl XK-540 | 137 | 18.6 | 89 | 6.2 | unknown |
| Acronal Pro 7600 | 103 | 13.4 | 228 | n.a | 20 |

n.a. = not applicable
*400 is upper limit of detection

4. Preparation and Application of Coating Compositions

The components of each of the primary composition a) and the secondary composition b) were produced by mixing the indicated ingredients for each of a) and b) in a conventional manner known to the person skilled in the art.

The primary composition a) was prepared in two steps. In the first step the dispersion of the pigment in water, stabilizer, thickener and auxiliary solvents, so-called mill base, was prepared. In the second step the mill base was blended with the polyurethane dispersion to obtain Component a).

Mill Base Preparation Procedure

Tap water, thickener, dispersing agent, stabilizer and coalescing agent were weighed e.g. into a 750 ml lined tin and stirred using a Dispermat high speed disperser blade under low shear (350 rpm). Fillers and pigments were added slowly into the tin and the shear rate was increased (up to 1300-1500 rpm) during the addition. After addition of fillers and pigments, the mill base was left at constant shear for 20 min. At the end, the degree of dispersion (fineness of grind) of the pigment was checked by using a grind gauge (Sheen Instruments) made of steel with a twin channel of e.g. 0-50 µm.

Let Down Phase

The polyurethane dispersion was charged in a new vessel. The Millbase was added slowly to the polyurethane dispersion while stirring. The temperature of the Millbase was lower than 40° C. before adding. At last some coalescing agents, additives and water was added.

Component a) was then subsequently mixed with Component b) prior to application, or Component a) was used directly as a one-component composition.

Application

The mixed coating composition was applied by spray application in a dry film thickness (dft) of 220-250 µm to the composite test specimens, which had been primed in advance with a standard epoxy primer, the total dft of the system (primer and composition of the invention) was in the range of 1200-1500 µm. The coating compositions was applied directly on the primed test specimens (prepared from epoxy glass fiber reinforced plastic laminate).

Table 5a and 5b indicates the composition and characterization of the exemplified coating compositions. The amounts of each component are given in percentages by weight of each total coating composition. Composition 2 is a one-component composition not comprising any isocyanate. Compositions 1 and 3-5 all contains a secondary composition comprising isocyanate, wherein the aqueous dispersion is present in an amount of about 11.9 times the amount of isocyanate calculated by weight.

TABLE 5a

Exemplified coating compositions of the invention

| | | 1 | 2 | 3 | 4 | 5 |
|---|---|---|---|---|---|---|
| Component a) | PU dispersion | | | | | |
| | Esacote PU 40 | 63 | 63 | — | — | — |
| | Esacote PU 77 | — | — | 63 | — | — |
| | Bayhydrol US 2558 | — | — | — | 63 | — |
| | Bayhydrol US 2891 | — | — | — | — | 63 |
| | Additives | | | | | |
| | Wetting and dispersing agent | 1.6 | 1.6 | 1.6 | 1.6 | 1.6 |
| | Thixotropic additive | 1.3 | 1.3 | 1.3 | 3.4 | 3.6 |
| | Defoamer | 0.35 | 0.35 | 0.35 | 0.3 | 0.3 |
| | Levelling Agent | 0.3 | 0.3 | 0.3 | — | — |

TABLE 5a-continued

| Exemplified coating compositions of the invention | | 1 | 2 | 3 | 4 | 5 |
|---|---|---|---|---|---|---|
| | Preservative | 0.1 | 0.1 | 0.1 | 0.1 | 0.1 |
| | corrosion inhibitor | — | — | — | — | — |
| | neutralisation agent | — | — | — | — | — |
| | Pigments and fillers | | | | | |
| | Titanium dioxide | 9.6 | 9.6 | 9.6 | 9.6 | 9.6 |
| | Colouring agents | 0.2 | 0.2 | 0.2 | 0.2 | 0.2 |
| | Barium sulfate | 19 | 19 | 19 | 19 | 19 |
| | Anticorrosion pigment | — | — | — | — | — |
| | Talcum | — | — | — | — | — |
| | Water (added) | 4.55 | 4.55 | 4.55 | 2.8 | 2.6 |
| | Organic solvent | — | — | — | — | — |
| Component b) | Isocyanate | | | | | |
| | Crosslinker 08 | 5.3 | — | 5.3 | 5.3 | 5.3 |
| | Organic solvent | — | — | — | — | — |
| Mixing ratio by weight a):b) | | 18.8:1 | — | 18.8:1 | 18.8:1 | 18.8:1 |
| Ratio by weight PU dispersion:isocyanate | | 11.9:1 | — | 11.9:1 | 11.9:1 | 11.9:1 |
| Rain erosion test (RET) | | Good | Good | Good | Good | Good |

TABLE 5b

| Comparative coating compositions | | C1 | C2 | C3 | C4 |
|---|---|---|---|---|---|
| Component a) | PU dispersion/Acrylic emulsion | | | | |
| | Esacote PU 940 | 45.8 | — | — | — |
| | Neocryl XK-540 | — | 45.8 | 45.8 | — |
| | Acronal Pro 7600 | — | — | — | 54 |
| | Additives | | | | |
| | Wetting and dispersing agent | 0.3 | 1.6 | 1.6 | 1.2 |
| | Thixotropic additive | 0.6 | 0.75 | 0.75 | |
| | Defoamer | 0.35 | 0.3 | 0.3 | 0.25 |
| | Levelling Agent | 0.3 | 0.3 | 0.3 | — |
| | Preservative | 0.1 | 0.1 | 0.1 | — |
| | corrosion inhibitor | — | — | — | 0.7 |
| | neutralisation agent | — | — | — | 0.5 |
| | Pigments and fillers | | | | |
| | Titanium dioxide | 9.6 | 9.6 | 9.6 | 15 |
| | Colouring agents | 0.2 | 0.2 | 0.2 | — |
| | Barium sulfate | 29 | — | — | — |
| | Anticorrosion pigment | — | — | — | 9 |
| | Talcum | — | 24 | 24 | 10 |
| | Water (added) | 13.8 | 17.4 | 17.4 | 6.8 |
| | Organic solvent | — | — | — | 2.6 |
| Component b) | Isocyanate | | | | |
| | Bayhydur XP 2547 | — | 10.3 | — | — |
| | Basonat HA 2000 | — | — | 7.4 | — |
| | Desmodur E2863XP | — | — | 7.4 | — |
| | Crosslinker 08 | 5.3 | — | — | — |
| | Organic solvent | — | — | 2.4 | — |
| Mixing ratio by weight a):b) | | 18.8:1 | 9.7:1 | 5.8:1 | — |
| Ratio by weight PU dispersion:isocyanate | | 8.6:1 | 4.4:1 | 2.7:1 | — |
| Rain erosion test (RET) | | Poor | Poor | Poor | Fair |

5. Rain Erosion Test

The Rain Erosion Test (RET) is widely accepted as being the most suitable test for evaluating anti-erosive properties of coatings of wind blades. The idea is to simulate the erosive effect from collision with raindrops, dust particles, hailstone and the like by creating a controlled rain field in which the coated surface moves at high speed.

Rain Erosion Test (RET) was carried out using a rotating arms test rig which was designed for the purpose by R&D A/S. The test was carried out according to the DNVGL-RP-0171 Recommended Practice, Testing of Rotor Blade Erosion Protection Systems.

The erosion damage was reproduced on specimens mounted on an arm which rotates horizontally, through an artificial rain field. The rain impacts the surface of the test specimen and erodes the surface, which is protected with the coating to be tested. The degree of erosion damage caused by the droplet impacts was inspected and documented. This was performed by visual inspection and picture documentation at defined intervals. Detailed picture documentation enables the investigation of the initial damage at the end of the incubation period, as well as the damage progress. The time needed to erode the surface to a specified limit, was the measure which is used to compare the performance of the protections systems with each other. There are two erosion stages which are commonly used to specify the survival time of the specimens:

1. End of incubation period: The incubation period is defined as the exposure time until the first damage is visually detectable on the outer surface of the test specimen. The incubation period depends on the impact speed and thus, for rotating arm test rigs, on the position on the specimen.
2. Breakthrough to the underlying substrate: Breakthrough is defined as the point in time when the erosion breaks through the protection layer to the underlying substrate. The time of breakthrough depends on the impact velocity and thus, for rotating arm test rigs it also depends on the location on the specimen.

45 cm long U-shaped test specimens based on NACA 634-021 aerofoil geometry simulating the leading edge of a wind blade (as described in Appendix A.1, DNVGL-RP-0171), consisting of a composite substrate were coated with two applications by spray application providing a dry film thickness (dft) of the topcoat in the range of 220-250 μm The coated substrate was kept at controlled laboratory conditions, typically 25° C. and 50% RH, for at least 7 days to secure complete film formation.

Three test specimens were then mounted on the horizontal rotor arms, with a radial position of 1 m for the center of the specimen. The rotor was spun at a controlled radial velocity resulting in a range of test subject velocities.

Table 6 below indicates the test condition parameters specified and/or monitored during each test.

TABLE 6

| Rain Erosion Test conditions | | |
|---|---|---|
| Test Parameter | Unit | Nominal condition |
| Speed (tip - centre - root) | m/s | 125 - 105 - 84 |
| Rain field | mm/h | 29-33 |
| Water temperature | ° C. | 8 |
| Water quality | µS | <10 |
| Test chamber temperature | ° C. | 8-15 |
| Mean droplet size, diameter, d | Mm | 2.2-2.4 |

An incubation graph is expressed in terms of the recorded end of incubation periods at different impact velocities (ν, [m/s]) and specific numbers of impacts (N, [impacts/mm$^2$]), in a ν/N diagram. The ν/N diagrams (FIG. 1) were processed assuming that the data is described by a power of law:

$$N = k \cdot v^m$$

The parameters k and m are determined using a least square fit and the resulting curves are compared graphically in a ν/N graph, where the x-axis follows a logarithmic scale in order to produce linear representation of the rain erosion performance of the materials and, consequently, provides an easy comparison of their performance.

Based in the performance of coatings with an established track record in the industry, we have produce a model graph which allows the classification of the performance of coatings in the rain erosion test as poor, fair and good depending on their position in ν/N graph (see FIG. 2). Composition C3 is not apparent in FIG. 2 since the breakthrough appeared too fast to be depicted in the diagram.

As can be seen in tables 5a and 5b, resistance against rain erosion was good for the examples falling within the claimed coating compositions while the result was poor for the composition comprising Esacote PU 940 which has a very high particle size. For comparison two commercial examples of coatings with acrylic emulsions were tested for rain erosion resistance and only provided a fair or poor performance.

A further experiment made by the inventors has confirmed that a good rain erosion performance can be obtained by a coating composition of the invention although the dry film thickness is as low as 35-70 µm (typically obtained by one or two layers of roller application).

6. Taber Abrasion

Taber Abrasion was tested on two formulations according to ASTM D 4060. A 1 kg weight was applied to the coated steel panel. A CS-10 abrasive wheel was used and 2×500 revolutions used. After 1000 rotations a mass loss of 190 mg was observed for coat provided by a one-component coating composition comprising a PU dispersion while a mass loss of 150 mg was observed for a coat obtained from a coating composition comprising Esacote PU 40 and Crosslinker 08 in a weight ratio of 8.6:1.

While a one-component coating composition has many advances and a mass loss of 190 is well below the acceptable limit, the observation from taber abrasion studies demonstrated that a decrease in mass loss was observed by adding a minor amount of isocyanate.

7. Detection of Blister Formation

Test formulations T1, T2 and T3 were applied with Sagmeter doctor blade on tinned panels in applications of approximately 1×10 cm with dry film thicknesses in the range of about 45-95 µm for assessment of blister formation. FIGS. 3, 4 and 5 indicates that by increasing the relative amount of isocyanate let to blister formation and by consequence the acceptable dry film thickness was decreased.

8. Viscosity

The viscosity of compositions T1, T2 and T3 was determined using Stormer Viscosimeter according to ASTM D 562, set at a temperature of 25° C. As it appears from Table 7, the viscosity increased significantly with increasing amounts of isocyanate which compromises the application properties and the roughness of the coat. A lower viscosity provides better levelling properties and a smoother film formation.

TABLE 7

| test compositions for viscosity and visual blister detection | | | | |
|---|---|---|---|---|
| | | T1 | T2 | T3 |
| Component a) | PU dispersion | | | |
| | Esacote PU 40 | 62 | 62 | 62 |
| | Additives | | | |
| | Wetting and dispersing agent | 1.2 | 1.2 | 1.2 |
| | Thixotropic additive | 1.75 | 1.75 | 1.75 |
| | Defoamer | 0.4 | 0.4 | 0.4 |
| | Preservative | 0.12 | 0.12 | 0.12 |
| | Matting agent | 2.0 | 2.0 | 2.0 |
| | Pigments and fillers | | | |
| | Titanium dioxide | 9.5 | 9.5 | 9.5 |
| | Colouring agents | 0.12 | 0.12 | 0.12 |
| | Barium sulfate | 17.1 | 17.1 | 17.1 |
| | Water (added) | 2.81 | 2.81 | 2.81 |
| | Organic solvent | 3.0 | 3.0 | 3.0 |
| Component b) | Isocyanate | | | |
| | Crosslinker 08 | 5.3 | 11.1 | 20.0 |
| | Organic solvent | — | — | — |
| Mixing ratio by weight a):b) | | 18.8:1 | 9.0:1 | 5:1 |
| Ratio by weight PU dispersion:isocyanate | | 11.7:1 | 5.6:1 | 3.1:1 |
| Acceptable blister free film [dft/µm] | | 80 | 50 | 40 |
| Viscosity [KU/25° C.] | | 104 | 115 | 141 |

Other Methods for General Characterization of the Coating Composition

Characterization of various other properties of the coating compositions can be done for example by the following methods:

Solids Content

The solids content in the coating compositions can be calculated in accordance with ASTM D5201, or by determination of the percentage volume of non-volatile matter, dry film density and spreading rate of coating materials according to ISO 3233-1.

Calculation of the Volatile Organic Compound Content

The volatile organic compound (VOC) content of the coating compositions can be calculated in accordance with ASTM D5201.

Bend Test

A procedure in accordance with ISO 6860 or ISO 1519 can be followed. A 150-250 micron wet film is applied to a sanded and degreased steel panel of 0.8 mm thickness and, after film formation, the coated metal panel is bent around a cylindrical mandrel and the flexibility is assessed by observation of cracking.

Impact

Impact can be tested according to ISO 6272-2, which specifies a method for evaluating the resistance of a dry film of paint, varnish or related product to cracking or peeling from a substrate when it is subjected to a deformation caused by a falling weight, dropped under standard conditions, acting on a small-area spherical indenter.

Dry Hard Time

Dry hard time can be evaluated using the Beck Koller method in accordance with ISO 9117-4 which specifies a test for determining the times taken to reach various stages of drying of organic coatings, using a mechanical straight-line or circular drying-time recorder.

Artificial Weathering

The resistance of the coatings to UV degradation can be tested by artificial weathering according to ISO 16474-3, following the Test Cycle 1. Test Cycle No 1:4 hours UV-light at 60° C. with UVA-340 lamps (UVA-340, 0.83 W/m2 irradiation at 340 nm) followed by 4 hours condensation at 50° C. for a total of 1000 to 3000 hours.

Minimum Film Forming Temperature (MFFT)

MFFT can be determined for example by the method according to ISO 2115.

Degree of Gloss

Degree of gloss (optical property for surface) can be measured according to ISO 2813.

The invention claimed is:

1. A wind blade comprising:

an outer surface, and at least one coating layer applied to at least a part of the outer surface, the at least one coating layer, prepared from a coating composition comprising:

a) a primary composition comprising one or more aqueous dispersions of an aliphatic polyurethane; wherein said one or more aqueous dispersions has a particle size characterized by a D50 (median) value below 1000 nm; and b) a secondary composition comprising one or more polyisocyanates; wherein said one or more aqueous dispersions in a) is present in an amount of at least 5 times the amount of said one or more polyisocyanates in b) based on weight;

wherein the wind blade is a wind turbine blade.

2. The wind blade according to claim 1, wherein said at least one coating layer provides erosion protection of said wind blade.

3. The wind blade according to claim 1, wherein said at least one coating layer provides an erosion protection topcoat on said wind blade.

4. The wind blade according to claim 1, wherein said one or more aqueous dispersions in a) is present in an amount of at least 6 times the amount of said one or more polyisocyanates in b) based on weight.

5. The wind blade according to claim 1, wherein said one or more aqueous dispersions has the particle size characterized by a D50 (median) value below 900 nm.

6. The wind blade according to claim 1, wherein said one or more aqueous dispersions has a glass transition temperature (Tg) below 10° C.; and/or wherein a clear film prepared from said one or more aqueous dispersions has an elongation at break of at least 100%; and/or wherein a tensile strength at break of the clear film prepared from said one or more aqueous dispersions is at least 10 MPa.

7. The wind blade according to claim 6, wherein the clear film prepared from said one or more aqueous dispersions has the elongation at break of at least 200%.

8. The wind blade according to claim 1, wherein the one or more aqueous dispersions of an aliphatic polyurethane are based on polyester diols.

9. The wind blade according to claim 1, wherein said coating composition further comprises one or more further components selected from the group consisting of a filler, a pigment, and an additive, or a combination thereof, in a total amount of between 30-50% by weight of the coating composition.

10. The wind blade according to claim 1, wherein said one or more aqueous dispersions in a) is present in an amount of at least 10 times the amount of said one or more polyisocyanates in b) based on weight.

11. The wind blade according to claim 1, the particle size is characterized by a D50 (median) value below 200 nm.

12. The wind blade according to claim 1, wherein the aliphatic polyurethane does not contain a free isocyanate group.

13. The wind blade according to claim 1, wherein the at least one coating layer does not contain crosslinks between the one or more polyisocyanates and the aliphatic polyurethane.

14. The wind blade according to claim 1, wherein the one or more aqueous dispersions of the aliphatic polyurethane are based on polycarbonate diols.

15. A wind blade comprising a substrate having an outer surface, wherein at least a part of the outer surface is coated with a multilayer system comprising A) a putty layer applied on the outer surface of the substrate;

B) a primer layer applied on the putty layer;

C) at least one coating layer, wherein the at least one coating layer is formed from a coating composition comprising:

a) a primary composition comprising one or more aqueous dispersions of an aliphatic polyurethane; wherein said one or more aqueous dispersions has a particle size characterized by a D50 (median) value below 1000 nm; and b) a secondary composition comprising one or more polyisocyanates; wherein said one or more aqueous dispersions in a) is present in an amount of at least 5 times the amount of said one or more polyisocyanates in b) based on weight; and D) a leading edge protective coating layer covering at least a part of the wind blade, wherein the wind blade is a wind turbine blade.

16. The wind blade according to claim 15, wherein said at least one coating layer C) constitutes an erosion protection topcoat.

17. A method for protecting a wind blade against erosion, comprising a step of applying a coating composition comprising:

a) a primary composition comprising one or more aqueous dispersions of an aliphatic polyurethane; wherein said one or more aqueous dispersions has a particle size characterized by a D50 (median) value below 1000 nm; and b) a secondary composition comprising one or more polyisocyanates; wherein said one or more aqueous dispersions in a) is present in an amount of at least 5 times the amount of said one or more polyisocyanates in b) based on weight;

wherein the coating composition is applied on at least a part of an outer surface of said wind blade and allowing film formation to take place, thereby forming at least one coating layer that protects the wind blade against the erosion, wherein the wind blade is a wind turbine blade.

* * * * *